C. H. LUTGEN.
WHEEL RIM IMPLEMENT.
APPLICATION FILED MAR. 1, 1919.
1,318,394.  Patented Oct. 14, 1919.
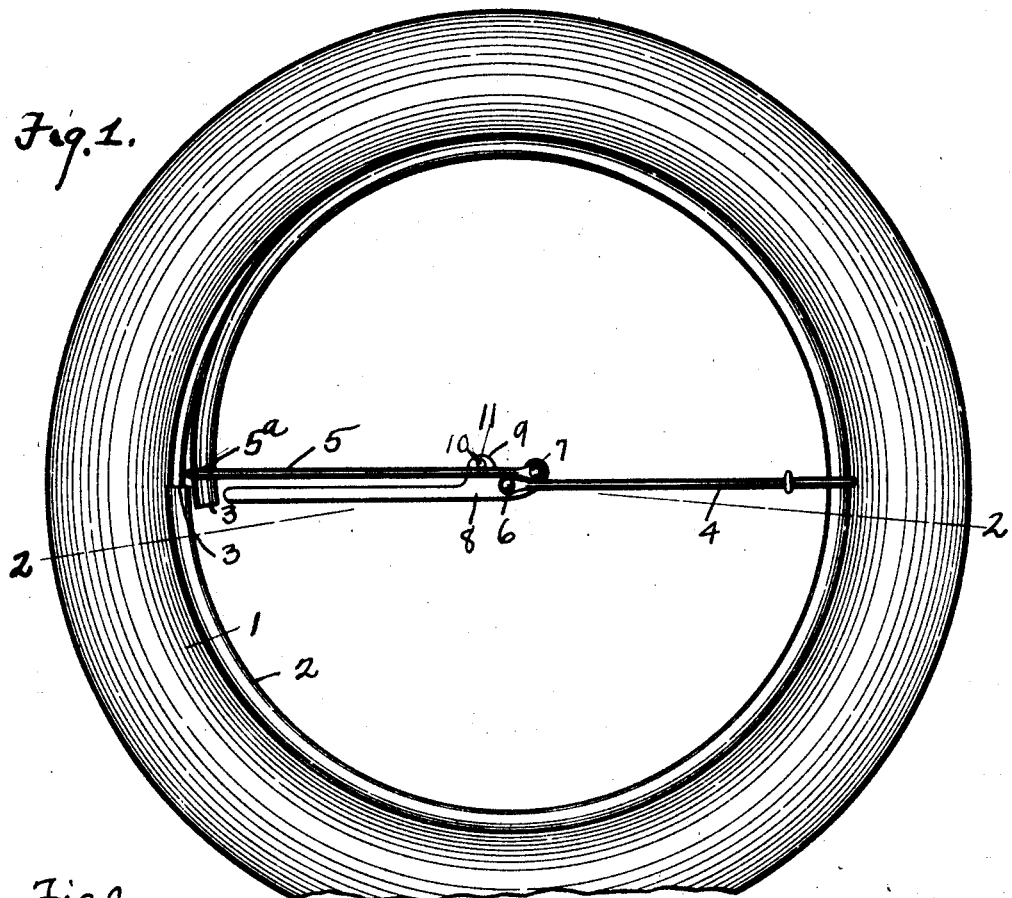
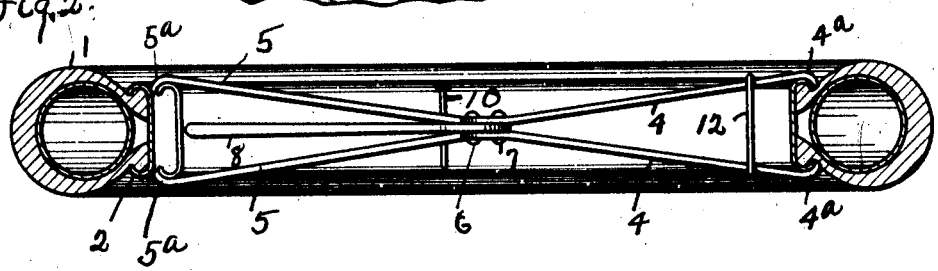
Inventor
Charles H. Lutgen
By
Attorney

UNITED STATES PATENT OFFICE.

CHARLES H. LUTGEN, OF ASHTABULA HARBOR, OHIO.

WHEEL-RIM IMPLEMENT.

1,318,394. Specification of Letters Patent. Patented Oct. 14, 1919.

Application filed March 1, 1919. Serial No. 279,961.

*To all whom it may concern:*

Be it known that I, CHARLES H. LUTGEN, a citizen of the United States, residing at Ashtabula Harbor, in the county of Ashtabula and State of Ohio, have invented new and useful Improvements in Wheel-Rim Implements, of which the following is a specification.

This invention relates to wheel rim implements and consists in certain improvements in the construction thereof as will be hereinafter fully described and pointed out in the claims.

Some wheel rims of the demountable type are transversely severed and in order to remove the tire one of the ends is sprung inwardly so as to clear the opposing end and thus permit the rim to contract facilitating the convenient removal of the tire.

The invention is illustrated in the accompanying drawings as follows:—

Figure 1 shows a side elevation of a tire and rim with the implement in place.

Fig. 2 a section on the line 2—2 in Fig. 1.

1 marks the tire which, as shown, is of a clencher type and 2 a rim which is severed at 3. The implement is formed with the rods 4 and 5. These are preferably arranged in pairs, two rods 4 forming one pair and two rods 5 forming a second pair, the two pairs when in place extending diametrically across the rim. The rods 4 and 5 are pivotally secured by pins 6 and 7 respectively with a lever 8, the rods of each pair being preferably arranged at opposite sides of the lever. The rods are provided with hooked ends 5ª and 4ª which are shaped to secure the rods to the edges of the rim.

When the lever is turned so as to interpose the space between the ends of the rods and in the general alinement with said rods the ends of the rods are extended sufficiently to be secured to the edges of the rim. By swinging the lever so as to bring the interposed space between the pins 6 and 7 approximately in alinement with the rods 4 and 5 but with the rods overlapped the implement as a whole is sufficiently contracted to spring in the end of the rim and consequenty permit the end of the rim to pass by the opposing end so that the rim as a whole is sufficiently contracted to permit the easy removal of the tire.

In order to lock the lever in contracted position I prefer to provide a locking mechanism. The lever 8 has a projection 9 which when the lever is in position to contract the implement projects between the rods 5 and a pin 10 is extended through a perforation 11 in the projection 9 and this engaging the rods locks the lever in position.

I prefer to provide a link 12 also which is slidingly mounted on the rods 4 and locks the hooked ends in engagement with the edges of the rim so as to prevent their disengagement. One of these links may also be provided for the rod 5, if desired, but ordinarily the operator can readily hold these ends in position until there is sufficient strain through the action of the lever 8 to lock them in position.

What I claim as new is:—

1. In a wheel rim implement, the combination of a lever; two pairs of rods, the rods of each pair being pivotally secured to the lever and arranged at opposite sides of the lever; and means on the ends of the rods for securing them to opposite edges of a wheel rim at diametrically opposite sides thereof.

2. In a wheel rim implement, the combination of a lever, said lever having a perforated projection thereon; two pairs of rods pivotally secured to the lever, the rods of each pair being oppositely placed on the lever; hooked ends on the rods adapted to engage the edges of a rim; and a pin extending through the perforation in the projection to lock the lever relatively to said rods.

In testimony whereof I have hereunto set my hand.

CHARLES H. LUTGEN.

Copies of this patent may be obtained for five cents each, by addressing the "Commissioner of Patents, Washington, D. C."